June 19, 1951 G. L. MEYERS ET AL 2,557,610
RESILIENT MOUNTING
Filed May 24, 1947
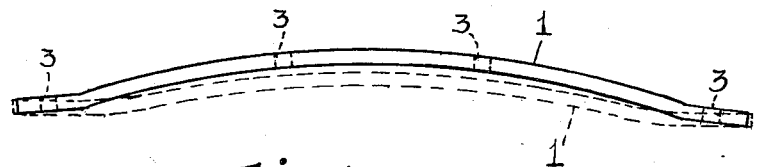
Fig. 1
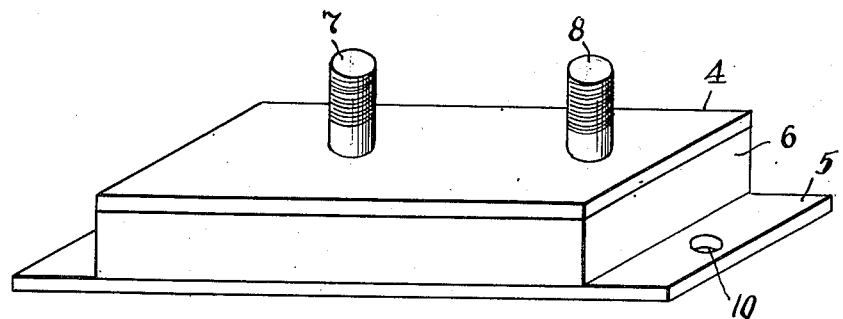
Fig. 2
Fig. 3
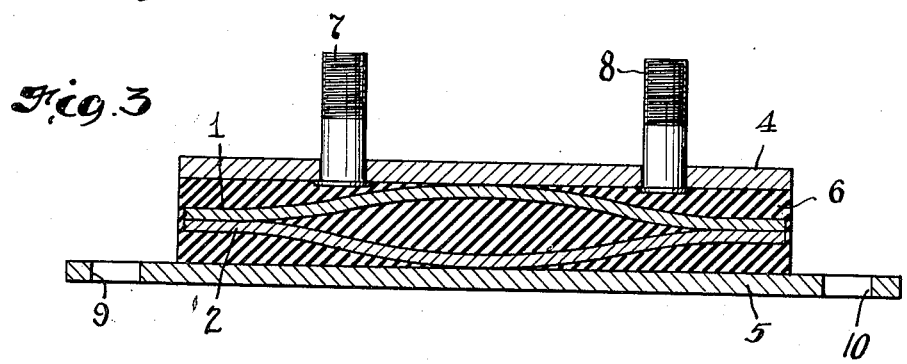
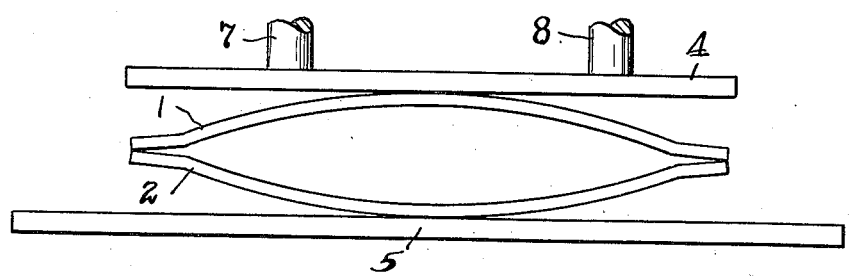
Fig. 4
INVENTORS
GEORGE L. MEYERS +
BY JOHN E. SCHRINER
Oberlin + Limbach
ATTORNEYS Patented June 19, 1951

2,557,610

UNITED STATES PATENT OFFICE 2,557,610

RESILIENT MOUNTING

George L. Meyers and John E. Schriner, Willoughby, Ohio, assignors, by mesne assignments, to The Ohio Rubber Company, Willoughby, Ohio, a corporation of Delaware Application May 24, 1947, Serial No. 750,286

6 Claims. (Cl. 248—21)

This invention relates, as indicated, to resilient mountings and more particularly to mountings and supporting means for engines, motors, and various machines where a considerable weight may require to be supported while at the same time vibration must be dampened or suppressed.

A great many forms of springs have been developed which may be employed in a variety of ways. It is also very old to employ blocks of rubber in various shapes as supporting means for machinery where vibration is to be reduced. It is, however, well known that a resilient rubber supporting member, when compressed by a considerable supported weight, loses much of its effectiveness in dampening vibration.

A primary object of our invention is, therefore, to provide a resilient mounting which is adapted to carry the supported weight with little or no normal compression of an associated compressible vibration dampening element.

Another object is to provide a resilient mounting in which a supporting spring is embedded in a body of rubber in such manner that the supported weight will not normally substantially distort such spring relative to such rubber.

Other objects will appear as the description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Fig. 1 is a side elevational view of a spring member adapted to be employed in one embodiment of our invention;

Fig. 2 is a perspective view of an assembled resilient mounting device according to our invention;

Fig. 3 is a vertical longitudinal sectional view of such device showing the manner of internal construction; and Fig. 4 is a side elevational view of the assembly prior to pre-loading of the spring elements and molding of the rubber body.

Referring now more particularly to said drawings, we prefer to employ a pair of arcuate leaf springs 1 and 2 which may desirably have apertures 3 therein for a purpose explained below. These two springs are placed in a mold between top and bottom plates 4 and 5, the respective end portions of such springs being opposed as shown in Fig. 4, and subjected to a pressure equal to the weight which the device will later be called upon to support. The application of this pressure will cause the springs to be deformed as shown in dotted line in Fig. 1, bringing their respective central portions closer together. The space between the two plates 4 and 5 is now filled with rubber 6 in plastic condition which is molded and vulcanized into a resilient compressible body with the pre-loaded spring members embedded therein. (Fig. 3.)

Plates 4 and 5 are thereby bonded to such body of rubber, as are the spring members, such springs being additionally secured thereto by the rubber which has entered apertures 3. Upper plate 4 may be provided with bolts 7 and 8 for attachment to the object to be supported, while lower plate 5 is provided with bolt holes 9 and 10 for securing to a foundation support. Alternatively, the rubber body or block 6 may be bonded directly to the supported and supporting surfaces without the employment of plates 4 and 5 and attendant attaching means.

When no weight is supported by this mounting there will obviously be tension in the portion of the rubber body between the springs. When a weight equal to the pre-loading pressure is placed upon the resilient mounting of our invention, however, such weight will be entirely and exactly supported by the spring members alone and the rubber will be in unstressed and uncompressed condition, effective to serve as vibration dampening means. If desired, the amount of pre-loading may be greater or less than the weight to be supported in order to obtain modified action of the supporting means. For certain purposes the mounting may even be formed without subjecting the springs to pre-loading, the resultant novel assembly providing more than the mere additive compression effects of rubber and spring members since the rubber is bonded to the springs and a shearing force is generated therebetween when a weight is imposed.

The term "rubber" as used herein and in the claims is intended to include the various equivalents and substitutes therefor, so far as the present application is concerned, such as neoprene for example (a chlorobutadiene polymer).

It is possible to reverse the relative positions of the two leaf springs so that their convex central portions are opposed. When this assembly is compressed, however, there will obviously be sliding metal-to-metal contact between the ends of such spring members and the respective top and bottom plates. The arrangement illustrated in the drawing is therefore preferred. Similarly, a single arcuate leaf spring may be employed, although subject to the same relative disadvantage. The positions of the bolts or other attaching means will, of course, be varied as appropriate to suit the particular situation.

It will be seen from the foregoing that we have provided a new type of resilient mounting comprising spring members and a body of resiliently deformable material such as rubber which is at the same time unusually effective in dampening vibration. The whole unit is readily assembled, requiring only conventional press and molding equipment, and is inexpensive to produce since the component parts are likewise simple in form.

Other modes of applying the principle of the invention may be employed, change being made as regards the details described, provided the features stated in any of the following claims, or the equivalent of such, be employed.

We therefore particularly point out and distinctly claim as our invention:

1. A resilient mounting comprising a resiliently deformable block of rubber, and a pair of arcuate leaf springs embedded in said block of rubber with the respective ends of said springs opposed to each other, said springs being pre-loaded under a pressure substantially equal to the weight to be supported by said mounting when thus embedded, so that when supporting such weight such rubber will be substantially unstressed and undeformed.

2. A resilient mounting comprising two spaced opposed metal plates, a molded block of resiliently deformable rubber bonded therebetween, and a pair of arcuate leaf springs embedded in said block of rubber in pre-loaded condition, the respective ends of said springs being opposed to each other.

3. A resilient mounting comprising a pair of arcuate leaf springs with their respective ends opposed, said springs being in pre-loaded condition and embedded within a molded resiliently deformable rubber body.

4. A resilient mounting comprising a pair of opposed arcuate leaf springs pre-loaded and embedded within a molded resiliently deformable rubber body.

5. A resilient mounting comprising a pair of opposed arcuate leaf springs embedded within a molded resiliently deformable rubber body.

6. In combination, a load, and means supporting said load comprising a pair of arcuate leaf springs embedded in a block of resiliently deformable rubber with the respective ends of said springs opposed to each other, said springs being disposed resiliently to support said load and pre-loaded prior to being embedded in such rubber under a pressure substantially equal to the load to be supported, whereby said block of rubber will normally be substantially undeformed while said load is thus supported and therefore especially effective to dampen vibration.

GEORGE L. MEYERS.
JOHN E. SCHRINER.

REFERENCES CITED

The following references are of record in the file of this patent:

UNITED STATES PATENTS

| Number | Name | Date |
| --- | --- | --- |
| 38,642 | Vose | May 19, 1863 |
| 49,786 | Plumer | Sept. 5, 1865 |
| 1,032,454 | Wainwright | July 16, 1912 |
| 1,679,698 | Weydert | Aug. 7, 1928 |
| 1,924,555 | Hubbard | Aug. 29, 1933 |